United States Patent [19]

McCord

[11] Patent Number: 4,506,520
[45] Date of Patent: Mar. 26, 1985

[54] VAPOR GENERATING AND RECOVERY APPARATUS

[76] Inventor: James W. McCord, 9101 Nottingham Pkwy., Louisville, Ky. 40222

[21] Appl. No.: 519,518

[22] Filed: Aug. 1, 1983

[51] Int. Cl.³ .................. F25B 41/00; B01D 3/42
[52] U.S. Cl. ............... 62/196.4; 62/238.5; 202/206; 203/DIG. 4
[58] Field of Search .......... 62/238.5, 238.6, 196.4; 202/170, 206, 160; 203/2, 24, 26, DIG. 4; 134/12, 31

[56] References Cited

U.S. PATENT DOCUMENTS 4,014,751 3/1977 McCord .................. 202/160
4,270,363 6/1981 Maring et al. ........... 62/196.4
4,299,664 11/1981 Smith .................... 202/170

Primary Examiner—H. B. Tanner
Attorney, Agent, or Firm—Charles G. Lamb

[57] ABSTRACT

A vapor generating and recovery apparatus for generating a vapor from a liquid solution and recovering the vapor in a liquid form in at least one chamber of the apparatus, the vapor generating portion of the chamber being in heat emitting relation with a heat emitting means and the vapor recovering portion of the chamber being in heat absorbing relationship with a heat absorbing means. A preferred system for providing heat to the vapor generating portion of the chamber and removing heat from the vapor recovering portion of the chamber is a variable heat system which includes a main heat emitting means and a main heat absorbing means in heat transfer relation with the vapor generating and recovery chamber. The variable heat system further includes a complementary heat emitting means outside the chamber between the main heat emitting means and main heat absorbing means for removing excess heat from the heat transfer fluid leaving the vaporizing portion of the chamber. Furthermore, the variable heat system includes a by-pass for selectively by-passing a selected amount of heat transfer fluid from the compressor around the main heat emitting means or vaporizing portion of the chamber.

13 Claims, 4 Drawing Figures

VAPOR GENERATING AND RECOVERY APPARATUS

BACKGROUND OF THE INVENTION

This invention relates to a vapor generating and recovering apparatus for vaporizing a liquid and condensing the vaporized liquid. More particularly, this invention relates to a heat transfer system for a vapor generating and recovering apparatus.

In the present state of the art, vapor generating and recovering devices for vaporizing a liquid and condensing the vaporized liquid are utilized in many different areas. For example, in the cleaning of objects such as metallic tools, plastic parts, and the like, hot, boiling solvents have been utilized to remove undesirable particulate matter from these tools, parts, and the like by immersing soiled objects into the hot, boiling solvent. In bringing the solvent to a boiling temperature, a solvent vapor zone is created above the boiling solvent in the tank or chamber in which the aforementioned objects are placed for cleaning. The vaporized solvent is then subjected to cooling or condensing means and is recovered. Generally, the chamber or tank from which the solvent is vaporized is filtered or processed by other means to remove the contaminants therefrom and then reused.

SUMMARY OF THE INVENTION

It has now been found that the vapor generating and recovering apparatus for vaporizing a liquid and recovering the vaporized liquid, particularly a liquid cleaning solvent, cleaning can be accomplished by the utilization of a variable heat system which utilizes substantially all of the energy therein with little or no waste. In one preferred apparatus, a compressor is utilized to compress a heat transfer fluid and to discharge the heat transfer fluid at a super heat condition of high temperature and pressure which is then disposed through a primary or main heat emitting to boil a liquid solvent, the liquid solvent generally being a low molecular weight halogenated hydrocarbon, such as, for example, trichloromonofluoromethane, methylene chloride, trifluoroethane and the like. This main heat emitting means is disposed for communicating in heat exchange relation with the vaporizing compartment of a vapor generating and recovering apparatus. In the main heat emitting means hot gases are condensed to a liquid at relatively high pressures and temperatures wherein the vapor in the vaporizing portion of the apparatus utilized therein is evaporating or boiling to create a vapor zone in a given vapor generating device. Since more energy is available to this system as heat due to the motor input energy and the motor inefficiencies of the variable heat system it must be removed. Some of this heat is removed by radiant energy loss, by conduction of heat through the apparatus, and by heat absorbed by the parts being processed. There are occasions where these techniques of heat rejection are not sufficient to totally balance the system. This is accomplished in this system by the use of a secondary or complementary heat emitting means utilized to remove this excess heat. The complementary heat emitting means dissipates heat energy either by externally cooled water, air, or other heat transfer means.

The condensed liquid heat transfer fluid then passes through an expansion device whereby the temperature and pressure are dropped and the heat transfer fluid passes into the main heat absorbing means which is utilized in the recovery portion of the apparatus. In the main heat absorbing portion of the variable heat system where the liquid heat transfer fluid evaporates to a gas, the main heat absorbing means becomes the condenser for the solvent vapor.

One of the unique features of the present invention is a by-pass system for selectively shunting a selected amount of heat transfer fluid around the main heat emitting means and re-mixing the shunted heat transfer fluid with heat transfer fluid leaving the main heat emitting means before or as it flows into the complementary heat emitting means. The amount of heat transfer fluid shunted around the main heat emitting means is controlled by design or a system condition, for example, the condition of the vapor in the condensing chamber. By shunting or by-passing heat transfer fluid at high pressure around the main heat emitting means, high temperature fluid passes into the secondary or complementary heat emitting means and increases the temperature differential between the heat transfer fluid and the heat absorbing heat transfer medium in the complementary heat emitting means. In one particular application where the temperature of the heat transfer fluid leaving the main heat emitting means is close to, equal to, or less than the temperature of the heat absorbing heat transfer medium of the complementary heat emitting means, it is necessary to increase the temperature of the heat transfer fluid entering the complementary heat emitting means. This is accomplished by by-passing a portion of the heat transfer fluid around the main heat emitting means thereby providing a high temperature gas to mix with the lower temperature fluid leaving the main heat emitting means.

Another unique feature of the present invention is the operation of the complementary heat emitting means which is controlled by a condition of the heat transfer fluid leaving the main heat emitting means, such as the heat transfer fluid temperature or pressure.

It has also been found that with the utilization of the aforementioned type system the principals of latent energy have been incorporated. This means that the heat transfer fluid boils in the main heat absorbing means which in turn condenses the solvent and the heat transfer fluid liquifies in the main heat emitting means while the solvent boils, the solvent being vaporized therefrom. Uniform temperature is experienced throughout these portions of the system to provide for better economics in the recovery of solvents. In addition, the temperature of the main heat emitting means is reasonably low in temperature and is not sufficient to decompose the solvent utilized. This provides a degree of safety experienced from this apparatus.

In preferred utilization of the vapor generating and recovery device of the present invention, specifically in relation to a vapor cleaning device, a more fully described apparatus is hereinafter discussed.

Various other features of the present invention will also become obvious to those skilled in the art upon reading the disclosure set forth hereinafter.

More particularly, the present invention provides a vapor generating and recovering apparatus for vaporizing a liquid and condensing the vaporized liquid comprising a housing including at least one chamber therein for vaporizing a liquid and recovering the vapor in the form of a liquid; and, a variable heat system including a main heat emitting means disposed in heat emitting relationship with the liquid in the chamber, main heat absorbing means disposed in heat absorbing relationship with vaporized liquid in the chamber, a compressor for compressing a heat transfer fluid, the compressor being in fluid communication on its discharge side with the main heat emitting means and on its inlet side with the main heat absorbing means, a complementary heat emitting means in heat transfer relation with the main heat emitting means and the main heat absorbing means, and by-pass means in fluid communication with the discharge side of the compressor upstream of the main heat emitting means and in fluid communication with the complementary heat emitting means downstream of the main heat emitting means for shunting a selected amount of heat transfer fluid around the main heat emitting means and re-mixing the shunted heat transfer fluid with the heat transfer fluid leaving the main heat emitting means.

BRIEF DESCRIPTION OF THE DRAWINGS

A better understanding of the present invention will be had upon reference to the following discussion in conjunction with the accompanying drawings in which like numerals refer to like parts throughout the several views and wherein.

DETAILED DESCRIPTION

Figure 1:
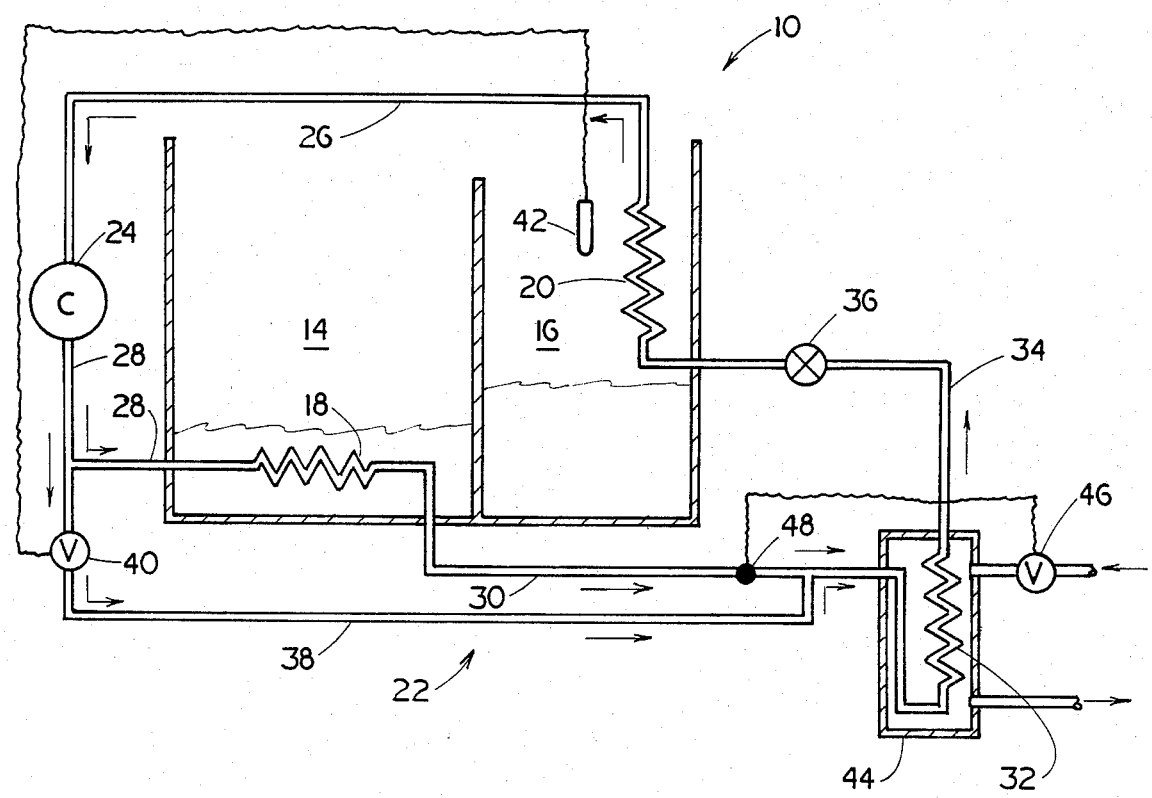
FIG. 1 is a schematic diagram of a preferred embodiment of an apparatus of the present invention.

FIG. 1 shows a vapor generating and recovery apparatus, generally denoted as the numeral 10, including a housing 12 illustrated as having two chambers 14 and 16. One chamber 14 is used for vaporizing a liquid and the other chamber 16 is used for condensing the vaporized liquid and recovering the said liquid. These chambers are provided for treating objects utilizing a boiling treating solution. The vaporizing chamber 14 includes a heating coil 18 therein which provides heat to a solution which is normally disposed within the chamber 14, the solution containing a vaporizable solvent therein. The heating coil 18 is preferably a condensing coil in a variable heat system to be discussed hereinafter. The heating coil 18 provides sufficient heat to the chamber 14 to boil or vaporize the solvent therein, the boiling action providing the treating or cleaning power for the solvent solution. Chamber 16, which is the vapor recovery chamber for the apparatus 10, includes a cooling coil 20 which is an evaporating coil in the variable heat system, to be discussed hereinafter, wherein the solution in this chamber 16 is maintained at a substantially low temperature, the temperature being low enough to maintain the solvent in a liquid condition.

With continued reference to FIG. 1, the variable heat system is generally denoted as the numeral 22. In addition to the heating coil 18 and cooling coil 20, the variable heat system 22 comprises a main compressor 24, of the type used in refrigerating systems, for compressing a suitable gaseous heat transfer fluid, exemplified as a refrigerant, which flows to the compressor 24 in a refrigerant section conduit 26 from the cooling coil 20. The compressor 24 compresses the suitable gaseous refrigerant, to a preselected pressure, and the pressurized hot refrigerant flows from the compressor 24 through a refrigerant section conduit 28 to the heating coil 18. The refrigerant is condensed in the heating coil 18 and upon condensing vaporizes the liquid in the vaporizing chamber 14. The refrigerant then flows through a refrigerant section conduit 30 from the heating coil 18 to a complementary condenser 32 wherein the refrigerant is further condensed and sub-cooled. The condensed refrigerant next flows from the complementary condenser 32 to the cooling coil 20 through a refrigerant section conduit 34. An expansion device exemplified as valve 36 is located in the refrigerant section conduit 34 to expand and lower the pressure of the refrigerant flowing back to the cooling coil 20 from the complementary condenser 32. Appropriate refrigerant accumulators and dryers (not shown) can be included in the refrigerant section conduit 34 as may be required for various operating conditions or applications. The refrigerant system further includes a refrigerant by-pass conduit 38 which serves to selectively shunt refrigerant gas from the compressor 24 around the heating coil 18. Toward this end, the by-pass conduit 38 is shown as being in flow communication with the refrigerant section conduit 28 upstream of the heating coil 18 and with the refrigerant conduit section 30 upstream of the complementary condenser 32. The flow of gaseous refrigerant allowed to by-pass the heating coil 18 via the by-pass conduit 38 is controlled by a valve 40 located in the by-pass conduit. The valve 40 can be actuated in response to various system parameters such as, for example, a change of refrigerant temperature or pressure in any of the refrigerant conduits, or a change in the conditions within a chamber 16 or 18. As illustrated, the valve 40 is actuated in response to a change in the temperature in the condensing chamber 16. To accomplish this, a vapor control probe 42 which is a temperature sensing device is located to sense the temperature in the zone around the cooling coil 20. The probe 42 actuates a solenoid or relay (not shown) which, in turn, opens and closes the valve 40 in the by-pass conduit 38.

The complementary condenser 32 is utilized to remove excess heat from the system. The complementary condenser 32 may be air cooled by, for example, a blower (FIGS. 2 and 4) for moving cooling air across the complementary condenser, or as illustrated in FIGS. 1 and 3, the complementary condenser 32 can be liquid cooled by, for example, water. As shown, the complementary condenser 32 is enclosed by a jacket 44 for circulating cooling liquid past the complementary condenser. The flow rate of the water is determined by a valve 46 at, for example, the inlet side of the jacket 44. The valve 46 is actuated in response to a refrigerant condition leaving the complementary condenser 32, for example, the pressure or temperature of the refrigerant. This refrigerant condition is sensed by a condition senser 48 in the conduit 30 downstream of the heating coil 18 but upstream of the juncture of the by-pass conduit 38 with the conduit 30. The senser 48 is operatively associated with the valve 48 by means of, for example, a solenoid to actuate the valve 48 thereby increasing or decreasing the volume rate of flow of cooling medium past the complementary condenser 32. If the temperature of the refrigerant leaving the heating coil 18 increases, as sensed by the senser 48, the senser causes the valve 46 to open allowing a greater volume rate of flow of cooling medium to circulate past the complementary condenser 32.

Figure 2:
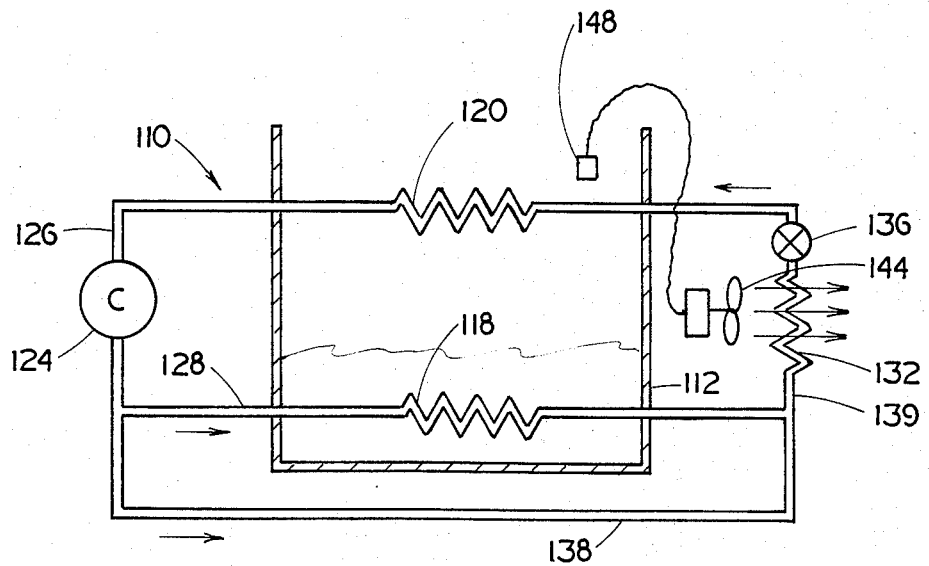
FIG. 2 is a schematic diagram of another preferred embodiment of an apparatus of the present invention.
Figure 3:
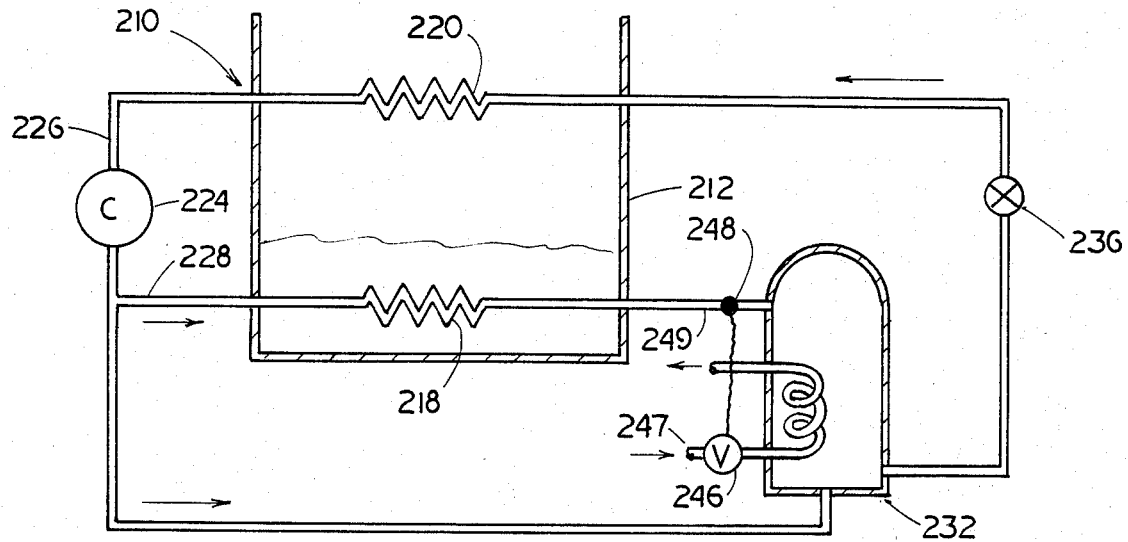
FIG. 3 is a schematic diagram of even another preferred embodiment of an apparatus of the present invention; and, FIG. 4 is a schematic diagram of another preferred embodiment of an apparatus of the present invention.

In FIG. 2, a vapor generating and recovery apparatus, generally denoted as the numeral 110, includes a housing or chamber 112 for vaporizing and condensing a liquid. In the bottom of the chamber 112 is a heating coil 118 which provides sufficient heat to a liquid solution within the chamber 112 to vaporize the liquid therein. In the upper portion of chamber 112 is a condensing coil 120 which provides sufficient cooling to condense to vaporized liquid in the chamber 112.

With continued reference to FIG. 2, the variable heat system including the heating coil 118 and cooling coil 120 is provided. The variable heat system further includes a main compressor 124 for compressing a suitable gaseous refrigerant which flows to the compressor 124 in a refrigerant section conduit 126 from the cooling coil 120. From the compressor 124, the gaseous refrigerant flows through a refrigerant section conduit 128 to the heating coil 118. The refrigerant condenses in the heating coil 118 and the liquid refrigerant then flows to a complementary condenser 132.

A conduit 138 is included to provide a by-pass of high pressure heat transfer fluid in gaseous form around the heating coil 118. The high pressure gas mixes with the condensed heat transfer fluid in conduit 139 just prior to entrance into the complementary condenser 132.

Heat is removed from the heat transfer fluid at the complementary condenser 132 by the use of air at ambient as noted by the numeral 144. Air blower 144 is actuated in response to the temperature of the vapor in the chamber 112. A temperature sensing element 148 is disposed at a selected location within chamber 112 and is in activating communication with the air blower 144.

The cooled heat transfer fluid leaves the complementary condenser 132 and passes through an expansion valve 136 where the fluid is expanded and the pressure is lowered as it flows to the cooling coil 120. Cooling coil 120 disposed at a preselected location in the vapor zone of the chamber 112 absorbs heat from the vaporized liquid thereby condensing the vaporized liquid. From cooling coil 120, the refrigerant flows through conduit 126 back to the inlet side of compressor 120.

In FIG. 3, a vapor generating and recovery apparatus, identified by the numeral 210, includes a housing or chamber 212 for vaporizing and condensing a liquid. In the bottom of the chamber 212 is a heating coil 218 which provides sufficient heat to a liquid solution within the chamber 212 to vaporize the liquid therein. In the upper portion of chamber 212 is a condensing coil 220 which provides sufficient cooling to condense the vaporized liquid within the chamber 212.

With continued reference to FIG. 3, the variable heat system including the heating coil 218 and cooling coil 220 is provided. The variable heat system further includes a main compressor 224 for compressing a suitable gaseous refrigerant which flows to the compressor 224 in a refrigerant section conduit 226 from the cooling coil 220. From the compressor 224, the gaseous refrigerant flows through a refrigerant section conduit 228 to the heating coil 218. The refrigerant condenser in the heating coil 218 and the liquid refrigerant then flows to a complementary condenser 232.

A conduit 238 is included to provide a by-pass of high pressure heat transfer fluid in gaseous form around the heating coil 218. The high pressure gas mixed with the condensed heat transfer fluid in the complementary condenser 232.

The complementary condenser 232 is water-cooled as exemplified by cooling water conduit 247. A valve 246 is provided in conduit 247 to regulate the flow of cooling water therethrough in response to actuation by a pressure sensing device 248 disposed in conduit 249. Pressure sensing device 248 is operable in response to preselected pressure conditions of heat transfer fluid leaving the heating coil 218.

The cooled heat transfer fluid leaves the complementary condenser 232 and passes through an expansion valve 236 where the fluid is expanded and the pressure is lowered as it flows to the cooling coil 220. Cooling coil 220 disposed at a preselected location in the vapor zone of the chamber 212 absorbs heat from the vaporized liquid thereby condensing the vaporized liquid. From cooling coil 220, the refrigerant flows through conduit 226 back to the inlet side of compressor 220.

Figure 4:
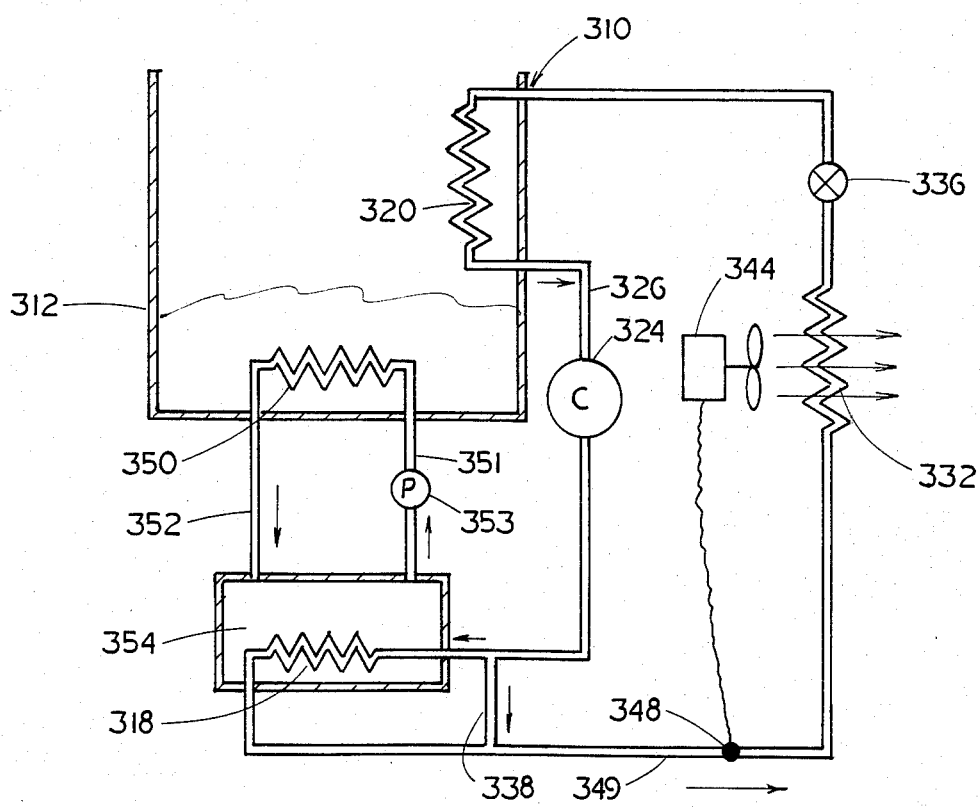

In FIG. 4, a vapor generating and recovery apparatus, identified by the numeral 310, includes a housing or chamber 312 for vaporizing and condensing a liquid. In the bottom of the chamber 312 is a heating coil 350 which provides sufficient heat to a liquid solution within the chamber 312 to vaporize the liquid therein. Heating coil 350 is in heat transfer relation with a heat emmiting means, exemplified by heating coil 318 of the variable heat system to be discussed hereinafter. Heating coil 350 is in a recirculating fluid system which includes inlet conduit 351, outlet conduit 352, a re-circulating pump 353 and a heat exchanger 354. The heat transfer fluid in the recirculating fluid system may be water or any other heat transfer fluid.

The heating coil 318 is disposed within the heat exchanger 354 to transfer heat from the variable heat system to the circulating heat transfer fluid.

With continued reference to FIG. 4, the variable heat system includes the heating coil 318 and the cooling coil 320. The variable heat system further includes a main compressor 324 for compressing a suitable gaseous refrigerant which flows to the compressor 324 in a refrigerant section conduit 326 from the cooling coil 320. From the compressor 324, the gaseous refrigerant flows through a refrigerant section heating coil 318 and then flows to a complementary condenser 332.

A conduit 338 is included to provide a by-pass of high pressure heat transfer fluid in gaseous form around the heating coil 318. The high pressure gas mixes with the condensed heat transfer fluid just prior to entering complementary condenser 332.

The complementary condenser 332 is air-cooled as exemplified by air blower 344. Air blower 344 is actuated in response to actuation by a pressure or temperature sensing device 348 disposed in conduit 349. Sensing device 348 is operable in response to preselected pressure or temperature conditions of heat transfer fluid in the conduit line 349.

The cooled heat transfer fluid leaves the complementary condenser 332 and passes through an expansion valve 336 where the fluid is expanded and the pressure is lowered as it flows to the cooling coil 320. Cooling coil 320 disposed at a preselected location in the vapor zone of the chamber 312 absorbs heat from the vaporized liquid thereby condensing the vaporized liquid. From cooling coil 320, the refrigerant flows through conduit 326 back to the inlet side of compressor 320.

It will be realized that various changes may be made to the specific embodiment shown and described without departing from the spirit of the present invention.

What is claimed is:

1. A vapor generating and recovery apparatus for vaporizing a liquid and condensing the vaporized liquid comprising:
   a housing including at least one chamber therein for vaporizing a liquid and recovering said vapor in the form of a liquid; and,
   a variable heat system including main heat emitting means disposed in heat emitting relationship with the liquid in said chamber, main heat absorbing means disposed in heat absorbing relationship with vaporized liquid in said chamber, a compressor for compressing a heat transfer fluid, said compressor being in fluid communication on its discharge side with said main heat emitting means and on its inlet side with the main heat absorbing means, a complimentary heat emitting means in fluid communication with said main heat emitting means and the main heat absorbing means, and by-pass means in fluid communication with the discharge side of said compressor upstream of said main heat emitting means and in fluid communication with the complimentary heat emitting means downstream of the main heat emitting means for continuously shunting a selected amount of less than all of the heat transfer fluid around said main heat emitting means so that the non-selected amount of the heat transfer fluid will continue to pass through the main heat emitting means concurrently, and remixing the shunted heat transfer fluid with the heat transfer fluid leaving the main heat emitting means.

2. The vapor generating and recovering apparatus of claim 1, said complementary heat emitting means being activated in response to preselected heat transfer fluid conditions.

3. The vapor generating and recovering apparatus of claim 2, said complementary heat emitting means being activated in response to preselected heat transfer fluid pressure conditions.

4. The vapor generating and recovering apparatus of claim 2, said complementary heat emitting means being activated in response to preselected heat transfer fluid temperature conditions.

5. The vapor generating and recovering apparatus of claim 1, said complementary heat emitting means being activated in response to preselected temperature of said vaporized liquid.

6. The vapor generating and recovering apparatus of claim 1 further comprising means for selectively controlling the amount of heat transfer fluid shunted through said by-pass means.

7. The vapor generating and recovering apparatus of claim 6, wherein said controlling means is activated in response to a change in the vapor conditions in said chamber.

8. The vapor generating and recovering apparatus of claim 7, wherein said change in vapor condition is a preselected temperature condition.

9. The vapor generating and recovering apparatus of claim 1 wherein said mixing of said by-pass heat transfer fluid with said heat transfer fluid leaving the main heat emitting means is upstream of said complementary heat emitting means.

10. The vapor generating and recovering apparatus of claim 1 wherein said mixing of said by-pass heat transfer fluid with said heat transfer fluid leaving the main heat emitting means is at the complementary heat emitting means.

11. The vapor generating and recovering apparatus of claim 1 wherein said complementary heat emitting means is air cooled.

12. The vapor generating and recovering apparatus of claim 1 wherein said complementary heat emitting means is liquid cooled.

13. The vapor generating and recovering apparatus of claim 1 wherein said main heat emitting means is in heat exchange relation with a heat exchange means which includes a second heat transfer fluid therein said second heat transfer fluid being in heat emitting relation with the liquid in said chamber.

* * * * *